Sept. 5, 1950        P. I. KEITH-MURRAY        2,521,376
ELECTRONIC PULSE GENERATING CIRCUIT
Filed April 6, 1948
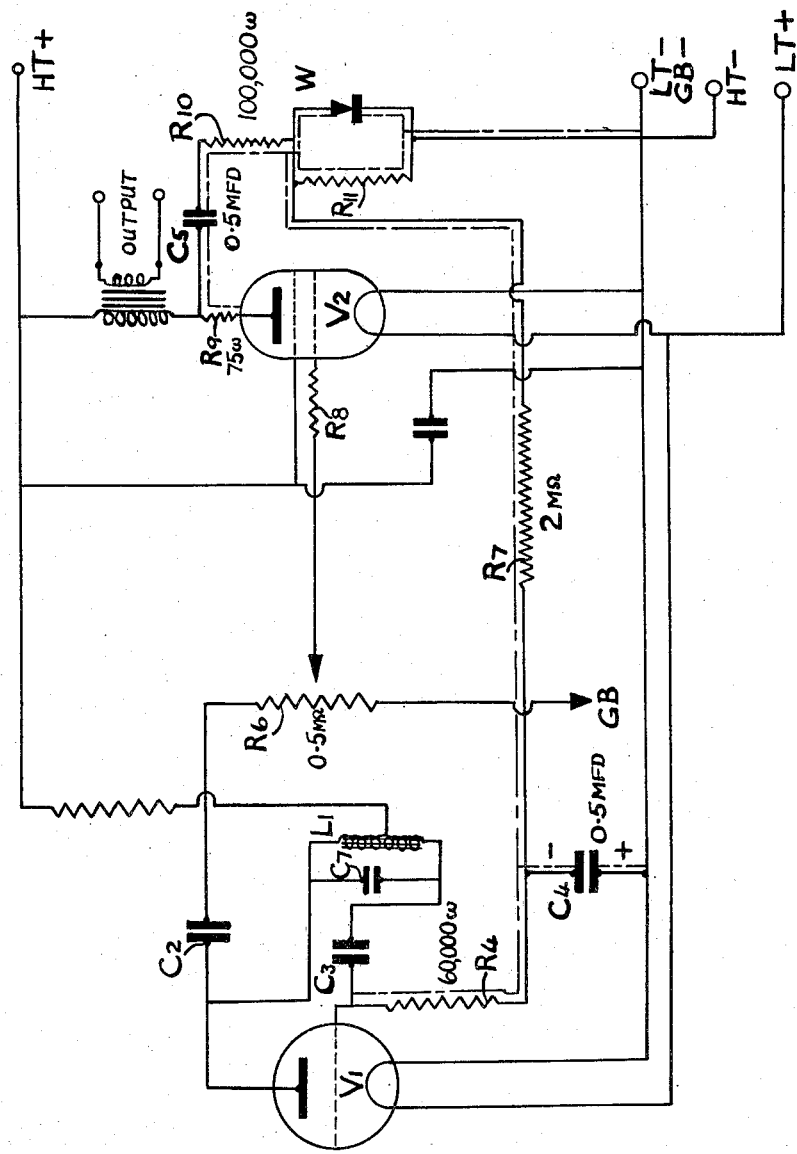
INVENTOR
PATRICK I. KEITH-MURRAY
BY Young, Emery & Thompson
ATT'YS Patented Sept. 5, 1950

2,521,376

UNITED STATES PATENT OFFICE 2,521,376

ELECTRONIC PULSE GENERATING CIRCUIT

Patrick Ian Keith-Murray, Crieff, Scotland

Application April 6, 1948, Serial No. 19,245
In Great Britain April 17, 1947

4 Claims. (Cl. 250—36)

This invention has for its object to provide an improved and simplified electronic circuit for generating pulses of a desired frequency. This circuit can be used for any purpose where wave trains of any desired frequency are required.

The circuit of the present invention comprises a valve oscillator, and means whereby the negative side of the alternating current generated by the oscillator is fed back to the control grid thereof, to arrest the oscillating current, said means including a rectifier, and a combination of resistance and capacity of such time constant that pulses of the generated frequency occur at the desired recurring intervals.

The invention will be readily understood by reference to the accompanying circuit diagram which illustrates a preferred means for producing the recurring pulses, and wherein a valve V1 is arranged to generate a suitable frequency by means of the circuit including the inductance L1 and condenser C7 connected to the anode and grid circuits of the valve V1. The circuit shown is a known series fed circuit including condenser C3, but any circuit to produce the desired oscillations may be used. These oscillations, which would normally be continuous, are fed as shown, through condenser C2 and resistances R6 and R8, to a second valve V2 for amplification. To convert the continuous oscillations into recurring pulses, a circuit is provided comprising a condenser C5, resistances R10 and R11, rectifier W, resistance R7, condenser C4 and resistance R4. This provides a circuit connection between the output circuit for the amplified voltage and the grid of valve V1. A resistance R9 is interposed between the anode of valve V2 and the output transformer and the condenser C5 is connected between the said resistance R9 and the output transformer. The resistance R10 is connected to the junction of the parallel-connected resistance R11 and rectifier W. As will be seen from the diagram, the condenser C4 is connected between the filament circuit of valve V1 and the resistance R7 and resistance R4.

The circuit operates, as indicated in broken lines in the diagram, as follows: The voltage generated by the valve V1 is fed to valve V2 and amplified. Part of the voltage now available at the anode of the valve V2 is fed through condenser C5 and resistance R10 to the rectifier W, which may be a valve, or copper oxide, or selenium, or other rectifier suitable for the frequency involved. The rectifier is so connected as to ensure positive sides of the cycle passing to earth or LT-. As the condenser C4 is connected through the resistance R4 to the grid of valve V1, a stage will be reached where the grid becomes so negative that the valve V1 ceases to oscillate, whereupon no voltage is developed at the anode of valve V2 and, consequently, the condenser C4 discharges through the resistances R7 and R11. This discharge eventually releases the grid of valve V1 and oscillations re-commence; thereby a voltage is generated again at the anode of valve V2 and condenser C4 recharges, eventually arresting the oscillations of valve V1, when the cycle repeats itself.

The speed of the pulses thus produced depends upon the time constant of the condenser C4 and the resistances R7 and R11, and on the voltage developed at the junction of the resistances R10 and R11.

The values given in the diagram will vary with the valves employed, those given in the diagram being by way of example only.

I claim:

1. An electronic pulse generating circuit comprising a valve oscillator including an electronic valve having at least an anode, cathode and grid producing an oscillatory current at the anode of the valve, an amplifying circuit for amplifying said oscillatory current, and a circuit connection between the output side of said amplifying circuit and the grid of said oscillator, said connection including a rectifier for suppressing the positive current flowing in said connection and including a combination of resistance and capacity of such time constant as to negatively and increasingly charge the grid of said valve oscillator until it ceases to emit an oscillatory current, whereupon the negative charge in said connection discharges in predetermined regular time cycles.

2. An electronic pulse generating circuit comprising a valve generator including an electronic valve having at least an anode, cathode and grid for producing an oscillatory current, an amplifying valve circuit arranged to amplify said oscillations, an output circuit for the amplified voltage, a resistor serially connected between the output circuit and the cathode of the valve, a rectifier shunted across said resistor for suppressing positive charge from the output circuit, a serially connected resistance and capacity shunted across said resistor and rectifier with the resistance connected to the cathode of the generator valve through said capacity, and means connected between the junction of the serially connected resistance and capacity for feeding a negative charge to the grid of the valve generator in predetermined regular time cycles depending upon the time constant of said resistance and capacity.

3. An electronic pulse generating circuit comprising a valve generator including an electronic valve having at least an anode, cathode and grid for producing oscillatory current, a valve amplifying circuit for amplifying said current including a valve having an anode and cathode, a rectifying circuit connected to the output from said amplifying circuit, said rectifying circuit including a condenser connected to the anode of said amplifying circuit, a first resistance connected to said condenser, a rectifier connected between said resistance and the cathodes of said valves, a second resistance connected in parallel with said rectifier, a grid feed connection between the junction of said rectifier and first resistance and the grid of said generator valve, a grid charging resistance in said grid feed connection, and a grid charging condenser connected between the grid and cathode of said generator valve, the time constant of said grid charging resistance and condenser being such that the grid of said generator valve is progressively negatively charged and suddenly discharges in predetermined time cycles.

4. An electronic pulse generating circuit comprising a valve generator including an electronic valve having at least an anode, cathode and grid for producing oscillatory current, a valve amplifying circuit for amplifying said current including a valve having an anode and cathode and an output transformer, a first resistance interposed between the amplifying valve anode and the output transformer of said amplifying circuit, a rectifying circuit connected to said amplifying circuit between said resistance and output transformer, said rectifying circuit including a series-connected condenser and second resistance, a rectifier and a third resistance in parallel connection between said series-connected condenser and second resistance and said cathodes, a feed-back connection between the grid of said generator valve and the junction of said second resistance and rectifier, a grid feed condenser across said feed-back connection and the cathode of said generator valve, a fourth resistance in said feed-back connection between said grid feed condenser and said second resistance, and a fifth resistance in said feed-back connection between said grid feed condenser and the generator valve grid fed thereby.

PATRICK IAN KEITH-MURRAY.

REFERENCES CITED

The following references are of record in the file of this patent:

UNITED STATES PATENTS

| Number | Name | Date |
|---|---|---|
| 2,010,253 | Barton | Aug. 6, 1935 |
| 2,277,000 | Bingley | Mar. 17, 1942 |
| 2,430,547 | Anderson | Nov. 11, 1947 |